United States Patent [19]

Veillard

[11] Patent Number: 4,796,106
[45] Date of Patent: Jan. 3, 1989

[54] A.C. SELF-BIASED MAGNETORESISTIVE REPRODUCE HEAD UTILIZING SECOND HARMONIC SIGNAL DETECTION

[75] Inventor: Dominique H. Veillard, San Diego, Calif.

[73] Assignee: Eastman Kodak Company, Rochester, N.Y.

[21] Appl. No.: 55,829

[22] Filed: May 29, 1987

[51] Int. Cl.[4] .................... G11B 20/06; G11B 5/127
[52] U.S. Cl. .................................... 360/30; 360/113
[58] Field of Search ........................ 360/30, 113, 67

[56] References Cited

U.S. PATENT DOCUMENTS 3,864,751 2/1975 Beaulieu et al. ................ 360/113
3,940,797 2/1976 Brock et al. ..................... 360/113

OTHER PUBLICATIONS

IEEE Transactions on Audio, Aug. 13, 1965, pp. 41–43, "Application of a Magnetoresistance Element to Magnetic Recording", K. Clunis, D. Cooper, J. Mullin.
IERE Conference Proceeding No. 35, 1976, Birmingham, England, pp. 251–260, "Suppression of Thermally Induced Pulses in Magnetoresistive Heads", F. Shelledy, S. Cheatham.

Primary Examiner—Vincent P. Canney
Attorney, Agent, or Firm—Daniel Robbins

[57] ABSTRACT

A self-biased magnetoresistive reproduce head is excited with an a.c. sense current which simultaneously a.c. biases the magnetoresistive element. When reproducing a pre-recorded signal, the spectrum of the head output includes sidebands containing the signal information associated with a suppressed carrier at twice the bias frequency. These sidebands are far removed in the head output frequency spectrum from sources of low frequency noise. The invention teaches demodulating these sidebands by means of a locally generated carrier corresponding to the suppressed carrier which has a frequency of twice the bias frequency. This locally generated carrier is coherent with the bias frequency source. The information signal is thereby recovered in a portion of the spectrum immune from the effects of low frequency interfering noise.

8 Claims, 5 Drawing Sheets

A.C. SELF-BIASED MAGNETORESISTIVE REPRODUCE HEAD UTILIZING SECOND HARMONIC SIGNAL DETECTION

BACKGROUND OF THE INVENTION

1. Field of the Invention

This invention relates to detection of a pre-recorded magnetic signal reproduced by an a.c. self-biased magnetoresistive (MR) head, and in particular to synchronous detection utilizing the second harmonic of the bias frequency.

Figure 1:
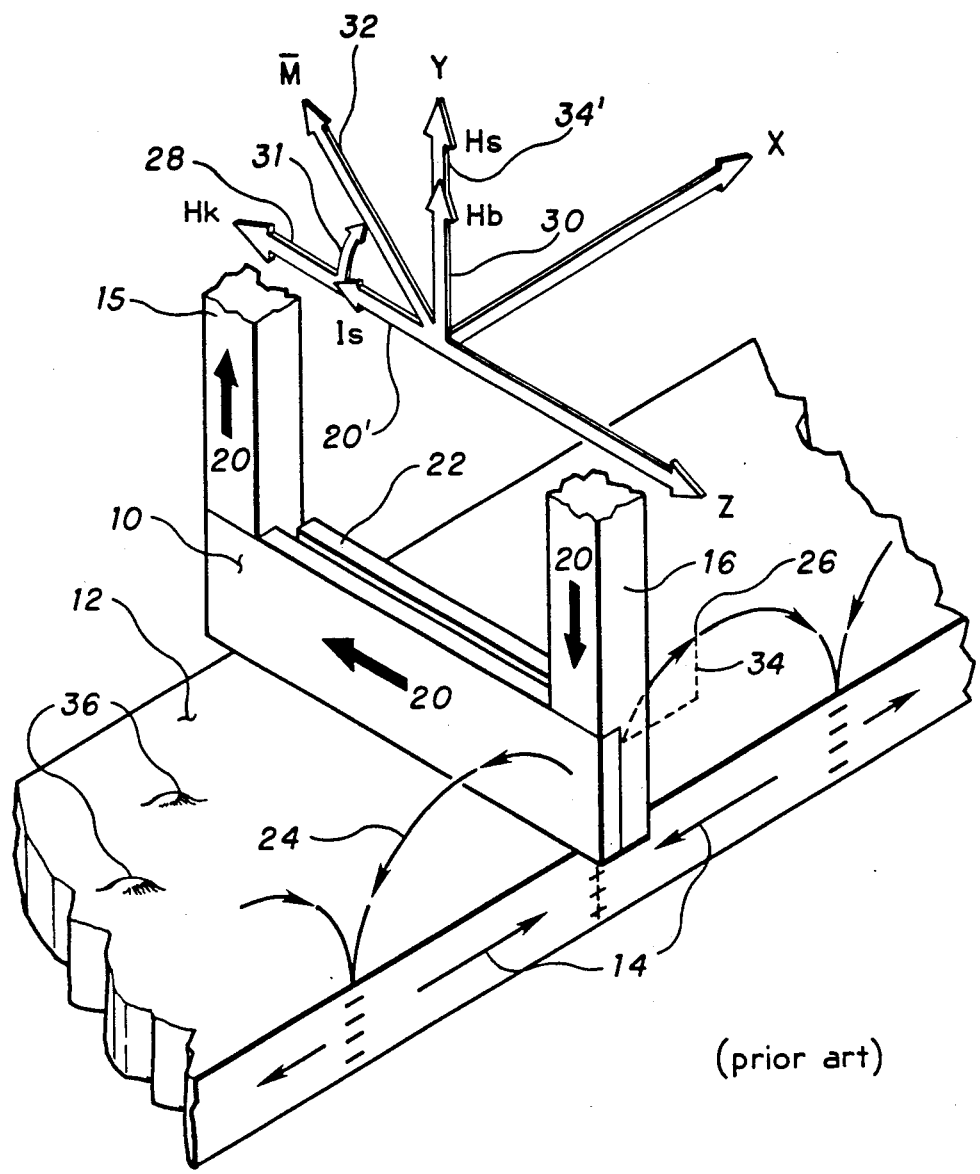
Figure 2:
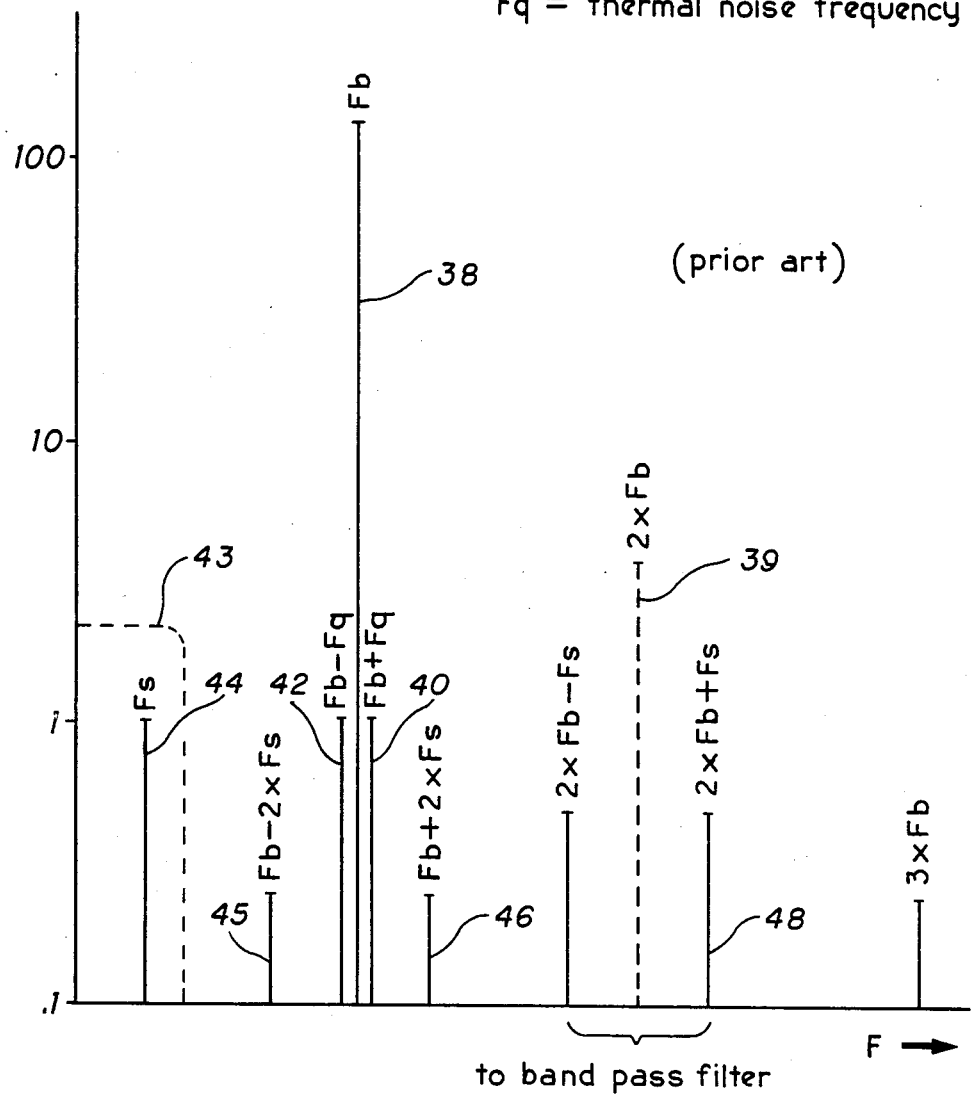
Figure 3:
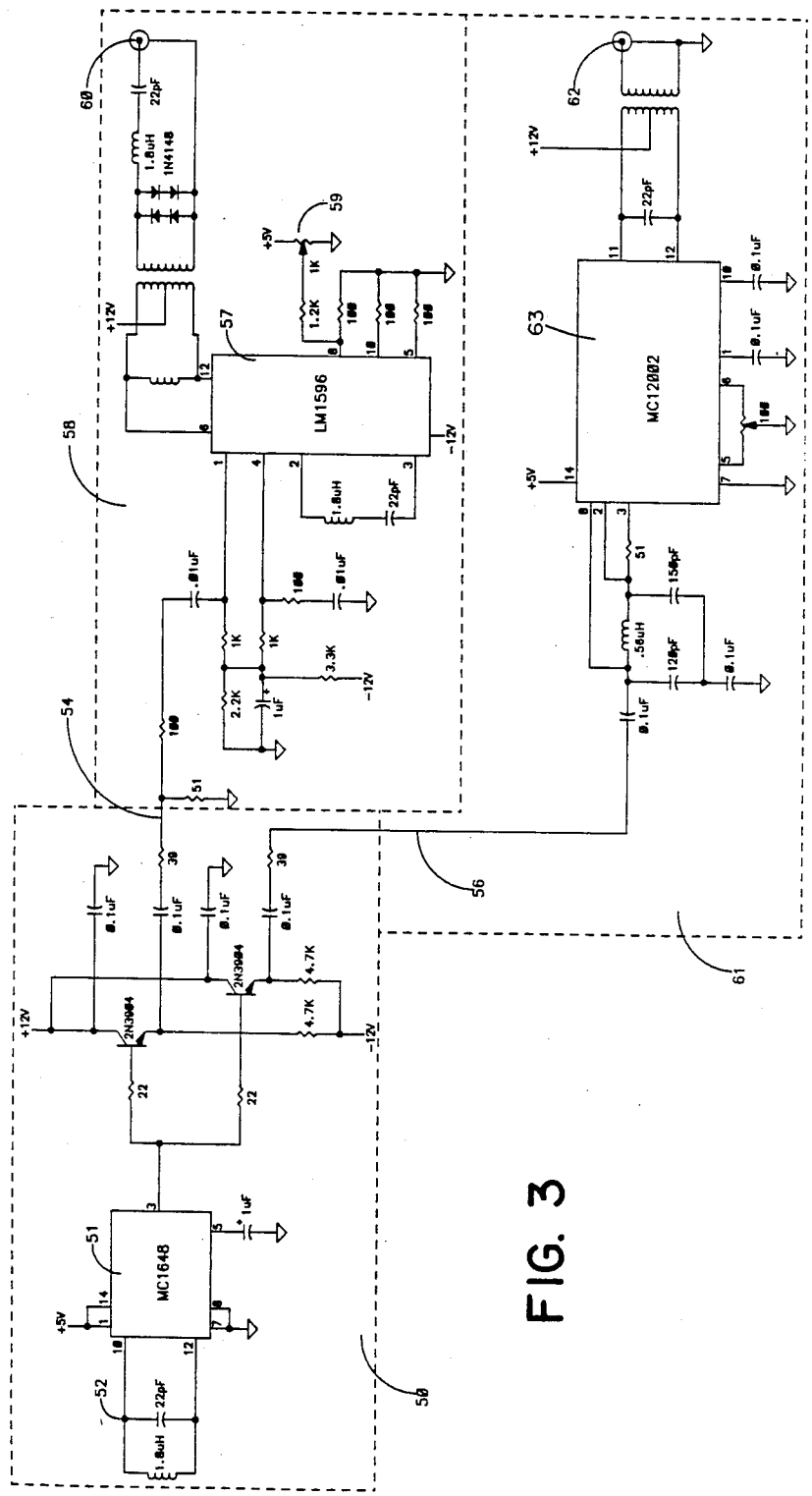
Figure 4:
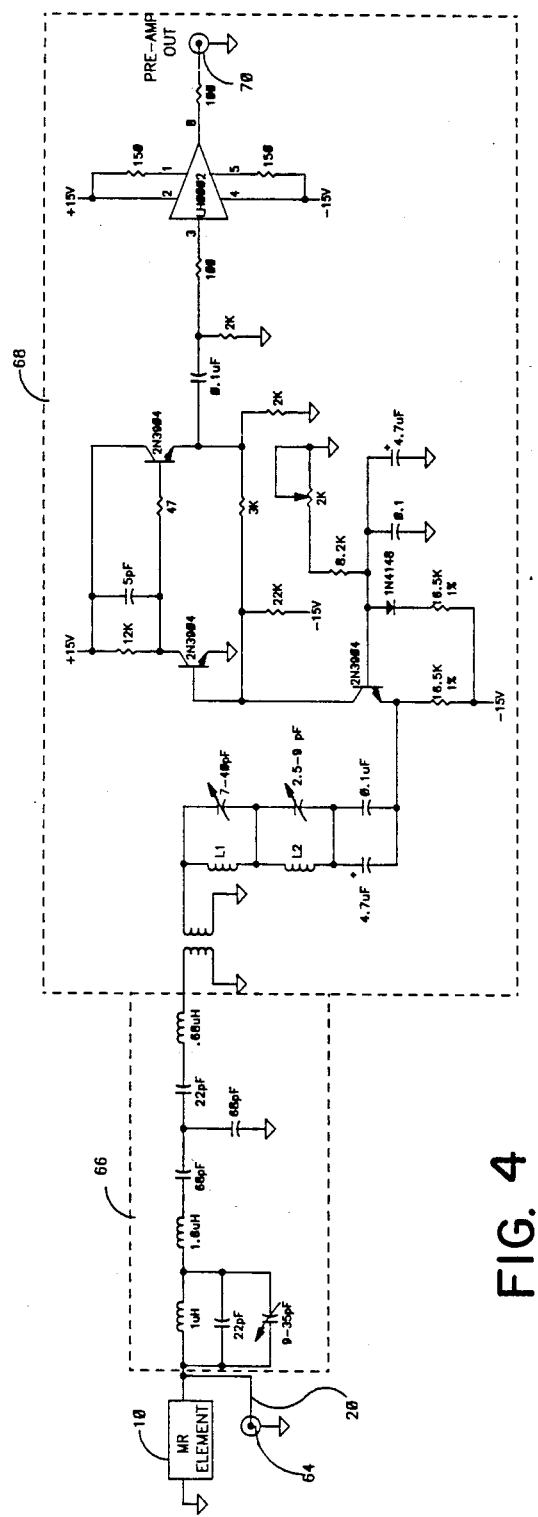
Figure 5:
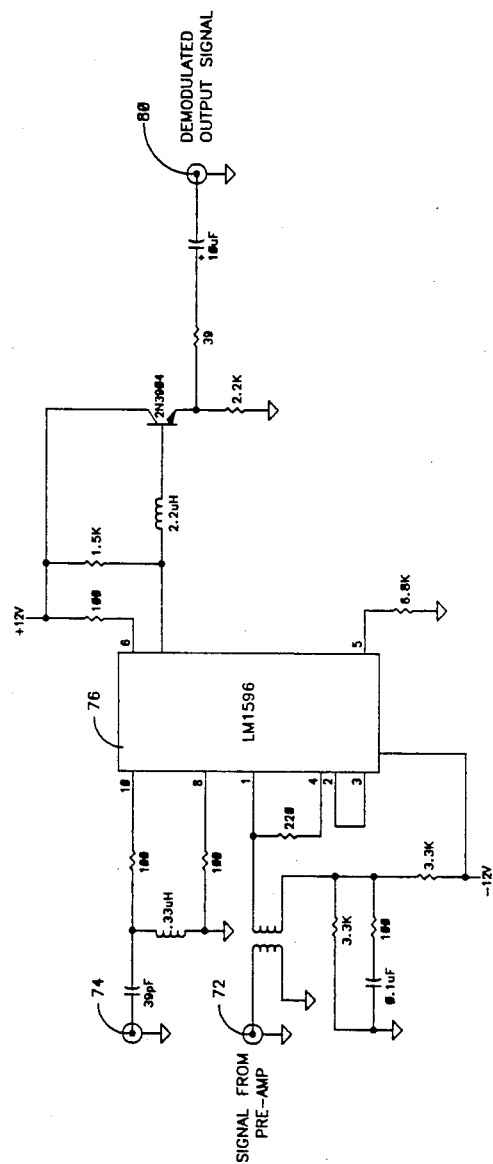

The invention, as well as the prior art, will be described with reference to the figures of which:

FIG. 1 is a perspective view of a prior art magnetoresistive head in contact with a section of magnetic tape, including a depiction of related vector quantities, FIG. 2 illustrates the spectrum, known in the prior art, associated with the signal output of an a.c. self-biased magnetoresistive head, and FIGS. 3, 4 and 5 are diagrams of circuits employed in a preferred embodiment of the present invention.

2. Description Relative to the Prior Art

Magnetoresistive reproduce heads are increasingly employed in the recovery of magnetically recorded information. They are readily fabricated in quantity using thin film technology and, accordingly, high density multitrack heads are currently available in small sizes at reasonable cost. While there is a variety of head designs, the operation of the essential elements comprising a self-biased MR head design may be understood by referring to FIG. 1. An MR element 10, which is generally a single domain layer of NiFe permalloy, is in contact with a magnetic tape 12 carrying a pre-recorded signal 14. Leads 15, 16 connected to the MR element 10 conduct a sense current 20 which flows through the MR element 10. In a self-biased head, the bias arises from the sense current excitation of the MR element, and in one embodiment the bias is achieved by means of a magnetically soft adjacent layer 22 located in proximity to the MR element 10. The magnetic field associated with the sense current 20 induces a magnetic field in the soft adjacent layer 22 which is proportional to the sense current and which, in turn, magnetically biases the MR element 10. In effecting signal reproduction, a pre-recorded signal 14 on the tape 12 gives rise to magnetic flux lines, e.g. 24, 26, which link the MR element 10.

Referring to the vector diagram illustrated in FIG. 1, the sense current 20', indicated by the vector Is, is in the direction of the easy axis field 28, indicated by the vector Hk, of the MR element 10. (In the drawings, different but related elements are designated by the same reference character, albeit that the associated elements are distinguished by the use of primes.) A bias field 30 induced by the soft adjacent layer 22 and indicated by the vector Hb, rotates the magnetization vector 32 of the MR element 10 through the angle 31 (as viewed in FIG. 1). The vertical component 34 of the signal field 24, 26, indicated by the vector Hs, 34' is also in the same direction as the bias field 30 and modulates the angle 31 in accordance with the recorded signal 14. The variation of the angle 31 between the magnetization vector 32 and the direction of the easy axis field 28 correspondingly varies the resistance of the MR element 10, and resultantly varies the amplitude of the voltage across the element 10 due to the sense current 20. This variation in voltage is detected to provide the signal output from the head.

Typically the sense current 20 is a d.c. current, and the recovered information signal is the baseband signal i.e. the basic information signal characterized by a spectrum from d.c. up to approximately the highest frequency component of the information signal. As shown in FIG. 1, the MR element 10 is placed as close to the magnetic tape 12 as is practicable, preferably in contact with the tape 12 in order to intercept the maximum number of signal field lines e.g. 24, 26. However, this proximity gives rises to a severe problem when a d.c. sense current is used. The magnetic tape is not completely uniform and homogenous: during fabrication asperities often become incorporated in the tape and sometimes appear as a "bump" 36 protruding from the magnetic tape 12 surface. As the tape 12 moves under the MR element 10, the bump 36 strikes the MR element 10, and the mechanical impact is dissipated as heat in the MR element 10 raising its temperature in the localized area of contact. Because the MR element 10 also has a temperature coefficient of resistivity, the impact with the bump 36 causes an increase in the MR element's resistance, and this resistance change results in the creation of a large amplitude noise spike in the output signal. This noise spike is comprised of low frequency components characteristic of its mechanical origin. As previously mentioned, the baseband information signal has a spectrum generally extending from d.c. to some maximum frequency component. When an MR element is excited with a d.c. sense current, the signal output from the MR head also appears as a voltage variation from d.c. to the maximum signal frequency. That is, the head response to the information pre-recorded on the tape is the baseband signal itself. Because the noise spike is comprised of low frequency components, these noise components fall directly into the region of the head output spectrum occupied by the information baseband. The noise components accordingly overlap the reproduced information components and, therefore, cannot be separated from the information simply by filtering.

One approach in solving this problem is described in the prior art by Shelledy and Cheatam in IERE Conference Proceedings #35, 1976, Birmingham, England. The basic idea is to translate the noise from the baseband region to a higher frequency region of the head output spectrum by means of a modulation technique, and thereby to separate the spike noise components from those of the information signal. In the Shelledy and Cheatam technique, the information, as will be described below, is recoverable directly in the low frequency portion of the head output spectrum, and may be retrieved by means of filtering techniques without noise contamination due to the spike. The modulation method requires the use of an a.c. carrier to effect the translation, and the carrier is realized by the use of a.c. for excitation of the MR element. This excitation serves not only as the sense current but also as the carrier which is modulated.

As previously mentioned, the field induced in the soft adjacent layer due to the sense current magnetically biases the MR element, and therefore an a.c. sense current results in a.c. biasing of the MR element. The bias is proportional to the sense current and the head output voltage is a function of the bias, the sense current, and the signal flux read from the tape. Resultantly, the head output voltage depends on the sense current in a nonlinear manner, because it is a function of several parameters each of which independently depends on the sense current. With the a.c. bias also acting as a carrier, the net result of this non-linear relationship is that signal sideband components related to higher harmonics of the bias (i.e. carrier) frequency also appear in the head output spectrum.

It will be appreciated that the noise spike frequency components and the information signal components derived from the tape interact differently with the a.c. biased MR element. When a noise spike occurs, the resistance of the MR element changes proportionately to the resultant thermal shock, and the voltage change appearing across the MR element due to the continuous flow of the sense current is directly proportional to the resistance change. That is, the voltage appearing across the MR element due to the sense current changes in amplitude with the resistance change, i.e. the voltage across the MR element is amplitude modulated. As is known in the art, the spectrum of an amplitude modulated signal consists of a carrier frequency and upper and lower sidebands. Specifying the dominant frequency component of the noise spike as Fq, and the bias frequency (i.e. carrier) as Fb, the amplitude modulation due to the noise spike gives rise to sidebands of Fb+Fq and Fb−Fq. Referring to the head output spectrum illustrated in FIG. 2, the sidebands Fb+Fq 40 and Fb−Fq 42 are clustered close the bias (i.e. carrier) frequency Fb 38, because Fq itself is a low frequency signal. As will be explained below, the information signal also appears in the head output spectrum directly as the baseband signal Fs 44. By selecting a bias (i.e. carrier) of high enough frequency to remove it from the vicinity of the information signal baseband location Fs 44, the noise sidebands (Fb−Fq) 42, (Fb+Fq) 40 and the bias (i.e. carrier) Fb 38, (as well as an artifact signal [Fb−2×Fs] which arises due to the non-linearity referenced above) may be separated from the information signal Fs 44 by means of a low pass filter whose response 43 cuts off just above the information baseband signal Fs 44.

As described above, the noise spike causes a change in the resistance of the MR element which directly results in the amplitude modulation of the element output. On the other hand, the interaction during the reproduce operation between the information signal 14 prerecorded on the tape 12 and the MR element 10 is more complex. As previously stated, the bias of the MR element 10 due to the soft adjacent layer 22 is proportional to the sense current (i.e. carrier), and the voltage change across the MR element due to the signal component 34 is also proportional to the sense current. Because the output of the MR element is proportional both to the bias and to the sense current, a component is present in the head output that is proportional to the square of the sense current (i.e. carrier). That is, the signal output is proportional to the MR resistance change multiplied by the carrier, and to the bias which, in effect, also results in an additional multiplication by the carrier. It is known in the art, (Taub and Schilling, "Principles of Communication Systems", McGraw-Hill Book Company, 1971, pp. 86–87) that if a baseband signal is translated in frequency by multiplication with a carrier and if this signal is then again multiplied by the carrier, the baseband signal reappears as a component of the final product. It is this effect that the prior art utilizes in recovering the information signal uncontaminated by the noise components associated with the noise spike caused by the tape asperity.

With the above discussion in mind, and again referring to FIG. 2, information baseband signal Fs 44 is shown recovered in the low frequency region of the spectrum as taught in the prior art. While the technique described above results in separation of the information signal and the noise generated by the noise spike, the fact that the information signal is recovered in the low frequency region of the head output spectrum continues to present problems. The low frequency region is characterized by other troublesome noise sources, including power line hum, motor commutator and brush noise, and "1/f" amplifier noise. (The designation "1/f" noise relates to the noise invariably associated with the operation of electronic devices at low frequencies.) The energy of these low frequency noise sources is predominantly located in the region of the spectrum where the low level information baseband signal has been recovered, and any subsequent attempt at amplification of the information signal attendantly amplifies these interfering signals with no improvement in the signal to noise ratio.

SUMMARY OF THE INVENTION

Rather than recover the information baseband signal in the low frequency region of the spectrum of an a.c. self-biased MR head as taught in the prior art, the present invention teaches recovering the information signal from a higher frequency region of the spectrum which is immune from the always present low frequency noise. Referring to FIG. 2, it will be appreciated when a.c. bias is employed in a self-biased head, sidebands containing the information signal, [2×Fb]−Fs 46 and [2×Fb]+Fs 48, are available in a frequency region of the head output spectrum far removed from the region of low frequency interfering noise sources. The practice of the invention teaches amplifying and then demodulating these higher frequency side bands to obtain a noise free information signal.

No signal component appears in the output spectrum at the frequency (2×Fb) 39: for this reason the signal corresponding to the frequency (2×Fb) 39 is stated to be a "suppressed carrier". The sidebands 46, 48 of this suppressed carrier 39 are selected by means of a band pass filter, and are pre-amplified before demodulation. The practice of the invention also teaches using the available bias signal Fb 38 to generate a local carrier of twice the frequency of the a.c. bias excitation. This local carrier is phase coherent with the a.c. bias signal and serves as the reconstructed suppressed carrier which is "missing" from the head output spectrum. As is known in the art, (Taub and Schilling, supra, pp.87, 88), such a coherent carrier must be provided to effect the synchronous demodulation of the sidebands 46, 48. Upon demodulation, the information signal is thereby readily recovered from a noise free region of the spectrum with an attendant improvement of the signal to noise ratio over that attainable in the prior art.

DESCRIPTION OF THE INVENTION

Referring to FIG. 3, an oscillator circuit 50 generates the a.c. signal which drives a current source 58 whose output is the reproduce head MR element 10 sense current 20. As previously described, the sense current 20 also induces a magnetic field in the soft adjacent layer 22 (FIG. 1) which, in turn, biases the MR element 10. The oscillator circuit 50 additionally drives a doubler circuit 61 which provides the reconstructed suppressed carrier necessary for the synchronous demodulation of the information signal sidebands 46, 48 (FIG. 2). The oscillator circuit 50 is comprised of an MC1648 Voltage-Controlled Oscillator (VCO) 51, available from Motorola Inc., Phoenix, Ariz., whose oscillation frequency is controlled at 22.5 Mhz by a tuned circuit 52. This frequency is the basic sense current and bias frequency Fb 38 of FIG. 2. Two buffered outputs 54, 56 are provided from the oscillator circuit 50: the buffered output 54 feeds the adjustable current source 58 consisting of an LM1596 Balanced Modulator-Demodulator 57, available from National Semiconductor Corporation, Santa Clara, Calif., configured as a multiplier. (Because modulation consists of the multiplication of two signals, a modulator circuit may also be used as a multiplier). One input to the Balanced Modulator-Demodulator 57 (pins 1, 4) is the buffered oscillation signal 54 from the VCO 51 and the other input (pin 8) is an adjustable d.c. level voltage set by a gain control 59. The amplitude of the adjusted output current available at the port 60 is the product of these two levels.

The second buffered output 56 of the oscillator circuit 50 feeds the voltage doubler 61. The buffered output 56 is applied to one input (pin 8) of an MC12002 Analog Mixer 63, available from Motorola Inc., Phoenix, Ariz., and the same signal shifted by 90 degrees is applied to the second input (pin 2). It is known in the art that the multiplication of two sinusoidal signals of the same frequency that are in phase quadrature results in a sinusoidal signal of double the frequency of the input signals. Because the frequency of the input signals is 22.5 Mhz, the output signal from the Analog Mixer 63 is 45 Mhz. This 45 Mhz signal, derived from the VCO 51, is phase coherent with the source frequency oscillator 51. It is transformer coupled to provide an output at port 62. The signal appearing at port 62 is the reconstructed carrier corresponding to the suppressed carrier 39 of the head output necessary for synchronously demodulating the information sidebands 46, 48 (FIG. 2).

Referring to FIG. 4, the signal at the output port 60 of the current source 58 of FIG. 3 is applied to an input terminal 64 of the MR element 10, resulting in current flow 20 in the MR element 10; the other terminal of the MR element 10 being at ground potential. The signal voltage developed across the MR element 10 is applied to a bandpass filter 66 which is centered at the frequency of 45 Mhz, and which has a bandwidth of at least twice the information signal frequency Fs insuring that the signal sidebands 46, 48 (FIG. 2) associated with the suppressed carrier 39 are passed by the filter 66. It will be noted that the bias frequency Fb 38 itself, and the low frequency noise signal sidebands 40, 42 associated with it are outside the passband of the filter 66 are are effectively attenuated by it. The filtered signal is fed to a preamplifier 68 which amplifies the upper and lower sidebands of the suppressed carrier, and the amplified signal is available at the pre-amplifier output port 70. Referring to FIG. 5, the signal at the output port 70 of FIG. 4 is connected to a signal input port 72, and the locally generated 45 Mhz carrier signal available at the port 62 of FIG. 3 is connected to an input port 74. These signals are applied to a demodulator 76, which is a National Semiconductor Corp LM1596 Balanced Modulator-Demodulator, and the demodulated information signal then appears at the output port 80.

The invention, therefore, provides for the recovery by means of an a.c. excited self-biased MR head of the information reproduced from the magnetic medium in the higher frequency region of the head output spectrum. It utilizes the suppressed carrier sidebands present in the output of the self-biased MR head, and by providing a locally derived coherent carrier demodulates these sidebands to recover the information signal free of low frequency noise.

The invention has been described in detail with particular reference to preferred embodiments thereof, but it will be understood that variations and modifications can be effected within the spirit and scope of the invention.

What is claimed is:

1. An improved apparatus for recovery of a pre-recorded signal from a magnetic medium by means of a self-biased magnetoresistive reproduce head of the type adapted to have an a.c. sense current applied to the magnetoresistive element of said magnetoresistive reproduce head, wherein said pre-recorded signal effects modulation of resistance of said magnetoresistive element resulting in a voltage variation across said magnetoresistive element, said apparatus comprising:
   a. means for selecting sideband components of said voltage variation resulting from the coaction of said a.c. sense current and said modulation of resistance of said magnetoresistive element, to provide selected sideband components,
   b. local oscillator means having a frequency harmonically related to the frequency of said a.c. sense current for coacting with said selected sideband components, and
   c. demodulator means cooperating with said local oscillator means for demodulating said selected sideband components whereby said pre-recorded signal is recovered.

2. The apparatus of claim 1 wherein said selected sideband components are sideband components of the second harmonic suppressed carrier of said a.c. sense current.

3. The apparatus of claim 2 wherein said means for selecting said selected sideband components is substantially operative over a bandwidth equal to twice the frequency of the maximum frequency component of said pre-recorded signal.

4. The apparatus of claim 3 wherein said means for selecting said selected sideband components is essentially centered at a frequency equal to twice the frequency of said a.c. sense current.

5. The apparatus of claim 1, wherein said local oscillator means is twice the frequency of said a.c. sense current.

6. The apparatus of claim 5, wherein said local oscillator means is phase coherent with said a.c. sense current.

7. The apparatus of claim 6 wherein said local oscillator means is generated by a frequency doubler excited by the source of said a.c. sense current.

8. A method for the recovery of a pre-recorded signal from a magnetic medium by means of a self-biased magnetoresistive reproduce head adpated to have an a.c. sense current applied to the magnetoresistive element of said magnetoresistive reproduce head, wherein said pre-recorded signal causes modulation of resistance of said magnetoresistive element resulting in a voltage variation across said magnetoresistive element, said method comprising:
   a. selecting sideband components of said voltage variation resulting from the coaction of said a.c. sense current and said modulation of resistance of said magnetoresistive element, b. producing a local oscillating signal having a frequency harmonically related to the frequency of said a.c. sense current for coacting with said selected sideband components, and c. demodulating said selected sideband components in cooperation with said local oscillating signal, whereby said pre-recorded signal is recovered.

* * * * *